United States Patent
Cottet et al.

(10) Patent No.: US 11,978,030 B2
(45) Date of Patent: May 7, 2024

(54) SECURING AN ENTRY IN A USER DATABASE

(71) Applicant: ORANGE, Paris (FR)

(72) Inventors: Jean-Paul Cottet, Paris (FR); Olivier Massiere, Paris (FR); Pierre-Francois Dubois, Sceaux (FR)

(73) Assignee: ORANGE, Paris (FR)

( * ) Notice: Subject to any disclaimer, the term of this patent is extended or adjusted under 35 U.S.C. 154(b) by 816 days.

(21) Appl. No.: 15/315,969

(22) PCT Filed: Jun. 4, 2015

(86) PCT No.: PCT/FR2015/051487
§ 371 (c)(1),
(2) Date: Dec. 2, 2016

(87) PCT Pub. No.: WO2015/185869
PCT Pub. Date: Dec. 10, 2015

(65) Prior Publication Data
US 2017/0134953 A1    May 11, 2017

(30) Foreign Application Priority Data
Jun. 5, 2014   (FR) ..................... 14 55138

(51) Int. Cl.
*G06Q 20/20* (2012.01)
*G06Q 20/32* (2012.01)
(Continued)

(52) U.S. Cl.
CPC ........... *G06Q 20/20* (2013.01); *G06Q 20/322* (2013.01); *G06Q 20/3229* (2013.01);
(Continued)

(58) Field of Classification Search
None
See application file for complete search history.

(56) References Cited

U.S. PATENT DOCUMENTS 7,813,822 B1 * 10/2010 Hoffberg ................ H04N 7/163
 381/73.1
9,106,646 B1 * 8/2015 Zheng ..................... G06F 21/42
(Continued)

FOREIGN PATENT DOCUMENTS

| | | | | |
|---|---|---|---|---|
| CA | 2814547 A1 * | 4/2012 | ........... | G06Q 10/109 |
| CA | 3059872 A1 * | 10/2018 | ........... | G06Q 20/223 |

(Continued)

OTHER PUBLICATIONS

William Enck et al. TaintDroid: An Information-Flow Tracking System for Realtime Privacy Monitoring on Smartphones. https://dl.acm.org/doi/pdf/10.1145/2619091 (Year: 2014).*

(Continued)

*Primary Examiner* — El Mehdi Oussir
(74) *Attorney, Agent, or Firm* — Faegre Drinker Biddle & Reath LLP

(57) ABSTRACT

A method for securing an entry in a user database, the method being performed in a management server in charge of the database and comprising the steps of: receiving a network identifier of a user terminal, identifying the user terminal in a telecommunications network; transmitting to a network platform an operator of the telecommunications network a user confirmation request, the request comprising the network identifier of the user terminal; upon receiving a user confirmation from the network platform, creating an entry by the terminal user in the user database, the entry comprising the network identifier of the user terminal.

8 Claims, 3 Drawing Sheets

(51) Int. Cl.
*G06Q 20/42* (2012.01)
*G06Q 40/03* (2023.01)
*H04L 9/40* (2022.01)
*H04W 12/08* (2021.01)

(52) U.S. Cl.
CPC .......... *G06Q 20/425* (2013.01); *G06Q 40/03* (2023.01); *H04L 63/102* (2013.01); *H04W 12/08* (2013.01)

(56) References Cited

U.S. PATENT DOCUMENTS

| | | | |
|---|---|---|---|
| 9,306,929 B2* | 4/2016 | Jimenez Arreola | G06Q 10/02 |
| 9,338,637 B2* | 5/2016 | Reuhkala | H04W 8/06 |
| 9,692,754 B2* | 6/2017 | Genestier | H04L 63/0853 |
| 10,027,642 B2* | 7/2018 | Le Huerou | G06F 21/42 |
| 10,360,593 B2* | 7/2019 | Hunter | H04W 4/06 |
| 11,190,497 B2* | 11/2021 | Grab | H04L 63/0428 |
| 11,727,392 B2* | 8/2023 | Shrivastava | G06Q 20/3674 705/41 |
| 2004/0025057 A1 | 2/2004 | Cook | |
| 2006/0265243 A1 | 11/2006 | Racho et al. | |
| 2008/0288405 A1* | 11/2008 | John | G06Q 20/40 705/44 |
| 2009/0037982 A1* | 2/2009 | Wentker | H04L 63/08 726/3 |
| 2010/0262364 A1* | 10/2010 | Ikeda | G06Q 30/02 713/168 |
| 2011/0249658 A1* | 10/2011 | Wohlert | H04L 67/54 370/351 |
| 2012/0039213 A1* | 2/2012 | Cheng | H04W 76/12 370/254 |
| 2012/0047072 A1* | 2/2012 | Larkin | G06Q 20/02 705/44 |
| 2012/0084135 A1* | 4/2012 | Nissan | G06Q 30/0238 705/14.38 |
| 2012/0150992 A1* | 6/2012 | Mays | G06F 9/451 709/217 |
| 2012/0282954 A1 | 11/2012 | Zhu | |
| 2013/0019237 A1* | 1/2013 | Pardehpoosh | G06Q 30/0609 717/171 |
| 2013/0282581 A1* | 10/2013 | Singh | G06Q 20/322 705/44 |
| 2014/0108252 A1* | 4/2014 | Itwaru | G06Q 20/3276 705/44 |
| 2014/0164909 A1* | 6/2014 | Graff | G06F 16/957 715/234 |
| 2014/0194097 A1* | 7/2014 | Gaddam | H04W 12/06 455/411 |
| 2016/0012465 A1* | 1/2016 | Sharp | G06Q 20/321 705/14.17 |
| 2016/0110747 A1* | 4/2016 | Nakai | G06Q 30/0209 705/14.12 |
| 2016/0210632 A1* | 7/2016 | Li | G06Q 20/10 |
| 2016/0253652 A1* | 9/2016 | Je | G06Q 20/321 705/39 |
| 2016/0337846 A1* | 11/2016 | Lekontsev | H04W 4/185 |
| 2017/0154333 A1* | 6/2017 | Gleeson | H04L 63/0853 |

FOREIGN PATENT DOCUMENTS

| | | | | |
|---|---|---|---|---|
| CN | 103503010 A | * | 1/2014 | ......... G06F 16/2457 |
| CN | 105453524 A | * | 3/2016 | ........... G06F 16/951 |
| GB | 2493806 A | * | 2/2013 | ............. G06Q 20/20 |
| KR | 20130026655 A | * | 9/2011 | ............. G06Q 10/10 |
| WO | 2005/086504 A1 | | 9/2005 | |
| WO | 2008/008735 A2 | | 1/2008 | |
| WO | 2008/036475 A2 | | 3/2008 | |
| WO | WO-2013027045 A1 | * | 2/2013 | ............. G06Q 10/02 |
| WO | WO-2013040169 A1 | * | 3/2013 | ........... G06Q 20/202 |
| WO | WO-2013102856 A1 | * | 7/2013 | ........... G06Q 20/209 |
| WO | WO-2014002138 A1 | * | 1/2014 | ............. G06Q 10/06 |
| WO | WO-2014033295 A1 | * | 3/2014 | ............. G06Q 20/12 |

OTHER PUBLICATIONS

K. Goldman and E. Valdez, "Matchbox: secure data sharing," in IEEE Internet Computing, vol. 8, No. 6, pp. 18-24, Nov.-Dec. 2004. https://ieeexplore.ieee.org/document/1355918?source=IQplus (Year: 2004).*

Zhou et al.; Dissecting Android Malware: Characterization and Evolution. 2012 IEEE Symposium on Security and Privacy. https://www8.cs.ucy.ac.cy/courses/EPL682/papers/mobile-2.pdf (Year: 2012).*

Ilie-Zudor et al., A survey of applications and requirements of unique identification systems and RFID techniques. Computers in Industry 62, 227-252. https://shorturl.at/rxAMZ (Year: 2010).*

* cited by examiner

SECURING AN ENTRY IN A USER DATABASE

CROSS-REFERENCE TO RELATED APPLICATIONS

This application is the U.S. national phase of the International Patent Application No. PCT/FR2015/051487 filed Jun. 4, 2015, which claims the benefit of French Application No. 14 55138 filed Jun. 5, 2014, the entire content of which is incorporated herein by reference.

BACKGROUND

The present invention concerns the creation of entries in databases, and in particular the creation of a customer account with a commercial company for example.

Creating a customer account generally involves the manual completion of a form by the user, during which he must fill in fields corresponding to personal information (name, surname, address, telephone number, email address, for example).

Such a manual filling in is tedious for the user. Furthermore, the confidentiality of personal data is not ensured, the physical form being capable of being lost. Furthermore, the transposition of handwritten data in a virtual database may produce input errors.

The present invention improves this situation.

SUMMARY

For this purpose, it proposes a method for securing an entry in a user database, the method being performed in a management server in charge of the database and comprising the steps of:
  receiving a network identifier of a user terminal, identifying the user terminal in a telecommunications network;
  transmitting, to a network platform of an operator of the telecommunications network, a user confirmation request, the request comprising the network identifier of the user terminal;
  upon receiving a user confirmation from the network platform, creating an entry by the terminal user in the user database, the entry comprising the network identifier of the user terminal.

Thus, the creation of an entry in a user database is simplified compared to the solution from the state of the art. Indeed, only a network identifier, such as a telephone number, is necessary for the creation of the entry (of a customer account for example), and additional information may therefore be provided later by the user. Furthermore, by confirming the creation by the user by means of the network identifier of the user terminal, a seller associated with the management server can verify that the identifier communicated to him corresponds to the right person. The confirmation can indeed be made by the user in front of the seller, by means of the user terminal.

The confidentiality of the information related to the user is also improved by avoiding the completion of a paper form that may be lost.

According to an embodiment, the method may further comprise the following steps, performed in the network platform:
  upon receiving the user confirmation request, verifying that a security application is installed on the user terminal identified by the network identifier comprised in the request;
  in case of positive verification, transmitting a message to display a pop-up window via the security application installed on the user terminal, the pop-up window proposing to validate or cancel the confirmation; and
  in case of validation of the pop-up window by the user, transmitting a user confirmation to the management server.

This embodiment advantageously allows benefiting from a security application that can, for example, be installed on the security module (SIM card) of the mobile terminal. Furthermore, the network operator in charge of the network platform has easy access to the user terminals on which the security application is installed. The confirmation by the user is also facilitated by the use of a pop-up window. The pop-up window can also remind the user of the confirmation context (context of the creation of a user account and seller identification for example).

In addition, the method may further comprise the following step, performed in the network platform:
  in case of negative verification that a security application is installed on the user terminal, transmitting a message to the management server indicating that the security application is not installed on the user terminal.

Thus, a seller in charge of the management server can perform an alternative solution for creating the entry in the user database (completing the form by handwriting for example). Furthermore, the management server can thus classify the user terminals with or without the security application.

Alternatively, the method may further comprise the following step, performed in the network platform:
  in case of negative verification that security application is installed on the user terminal, transmitting a short message to the user terminal, the short message requiring a user confirmation;
  in case of receiving a short answer message comprising a user confirmation, transmitting the user confirmation to the management server.

According to this alternative, a replacement solution is advantageously provided in cases where the security application is not available. Short message refers to any SMS- or even MMS-type message. The short message may propose to the user to return a message of the same type to the network platform, the body of the message comprising for example "OK" to confirm the creation of the entry.

According to an embodiment, the method may further comprise the following steps, performed in the management server:
  upon receiving a user confirmation, transmitting to the user terminal a message comprising a link to a page to fill in additional data associated with the user;
  associating the additional data with the entry created in the user database.

Thus, the user has the possibility to decide when it wishes to fill in fields corresponding to additional information allowing completing the previously created entry.

In an embodiment of the invention, the method may further comprise the following steps, performed in the management server:
  receiving credit information associated with the network identifier of the user terminal;
  transmitting to the user terminal a request of credit approval by the user comprising the network identifier of the user terminal;
  upon receiving a credit approval by the user, updating, in the user database, a user credit based on the received credit information.

This embodiment allows benefiting from the previously created entry and allows securing the credit allocation by a seller to a customer having the user terminal.

According to an embodiment, the method may further comprise the following steps, performed in the management server:

receiving credit consumption information associated with the network identifier of the user terminal;

transmitting to the user terminal an approval request for the credit consumption by the user comprising the network identifier of the user terminal;

upon receiving an approval for the credit consumption by the user, updating, in the user database, a user credit based on the received credit consumption information.

This embodiment allows benefiting from the previously created entry and allows securing the credit consumption by a customer having a customer account with a seller in charge of the management server.

Additionally, transmitting an approval request to the user terminal may comprise transmitting a message to display a pop-up window via a security application installed on the user terminal.

The exchanges are thus secured and the confirmation by the customer is facilitated by the use of a pop-up window.

In addition, the user database may also store the network identifiers of the user terminals on which the security application is installed, and a message to display the pop-up window may be transmitted to the user terminal upon positive verification in the user database that the security application is installed on the user terminal.

According to an embodiment, the request for receiving a confirmation by the user may be transmitted to the network platform, upon verification that no entry corresponds to the network identifier of the user terminal in the user database.

This embodiment prevents the creation of repetitive entries in the user database.

A second aspect of the invention concerns a computer program comprising instructions to perform the method according to the first aspect of the invention, when this program is executed by a processor.

A third aspect of the invention concerns a management server in charge of a user database, the management server comprising:

a unit for receiving a network identifier of a user terminal, identifying the user terminal in a telecommunications network;

a network interface for transmitting a user confirmation request to a network platform of an operator of the telecommunications network, the request comprising the network identifier of the user terminal, and for receiving a user confirmation from the network platform;

a creating unit to create, upon receiving a user confirmation from the network platform, an entry from the terminal user in the user database, the entry comprising the network identifier of the user terminal.

A fourth aspect of the invention concerns a platform of a telecommunications network comprising:

a first network interface for receiving a user confirmation request from a management server of a database, the request comprising a network identifier of a user terminal identifying the user terminal in the telecommunications network;

a unit of verification that a security application is installed on the user terminal identified by the network identifier comprised in the request;

a second network interface for transmitting, in case of positive verification by the unit of verification, a message to display a pop-up window via the security application installed on the user terminal, the pop-up window proposing to validate or cancel the confirmation.

The first network interface may also be adapted to transmit a user confirmation to the management server, in case of validation of the pop-up window by the user.

BRIEF DESCRIPTION OF THE DRAWINGS

Other characteristics and advantages of the invention will arise in the consideration of the following detailed description, and the accompanying drawings on which.

DETAILED DESCRIPTION

Figure 1:
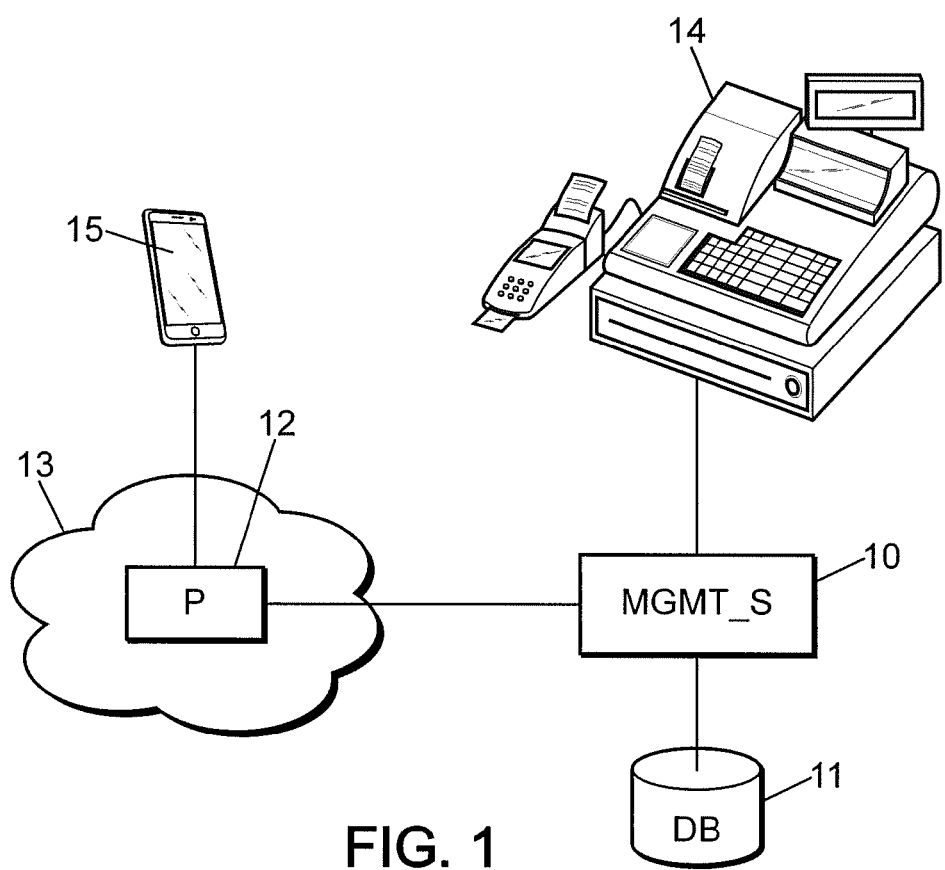
FIG. 1 illustrates a system for securing an entry in a user database according to an embodiment of the invention.

FIG. 1 illustrates a system for securing an entry in a user database according to an embodiment of the invention.

The system comprises a management server 10 in charge of a user database 11. The management server 10 and the user database 11 may for example belong to a seller that wishes to implement a customer loyalty system by proposing the creation of customer accounts.

The management server 10 communicates with a terminal 14 located for example in the store, and may for example be a bank card payment terminal, or a desktop or laptop computer, or even an NFC reader (for "Near Field Communication") able to communicate with a user terminal in the near field in order to acquire its network identifier. More generally the terminal 14 represents any mean for inputting numeric or alphanumeric data.

The management server 10 is also able to access a telecommunications network 13 and in particular a network platform 12 of the network operator. The network platform 12 may also communicate with mobile user terminals 15, such as portable phones, of Smartphone or "feature phone" type for example, or touchpad, and more generally with any terminal that can be equipped with a security module such as a SIM card and a user interface (screen and keyboard for example, or even voice input interface). A single user terminal 15 was represented in FIG. 1, for purely illustrative purposes. The user terminal 15 can thus be identified by a network identifier (for example a telephone number associated with the security module of the user terminal 15).

Figure 2:
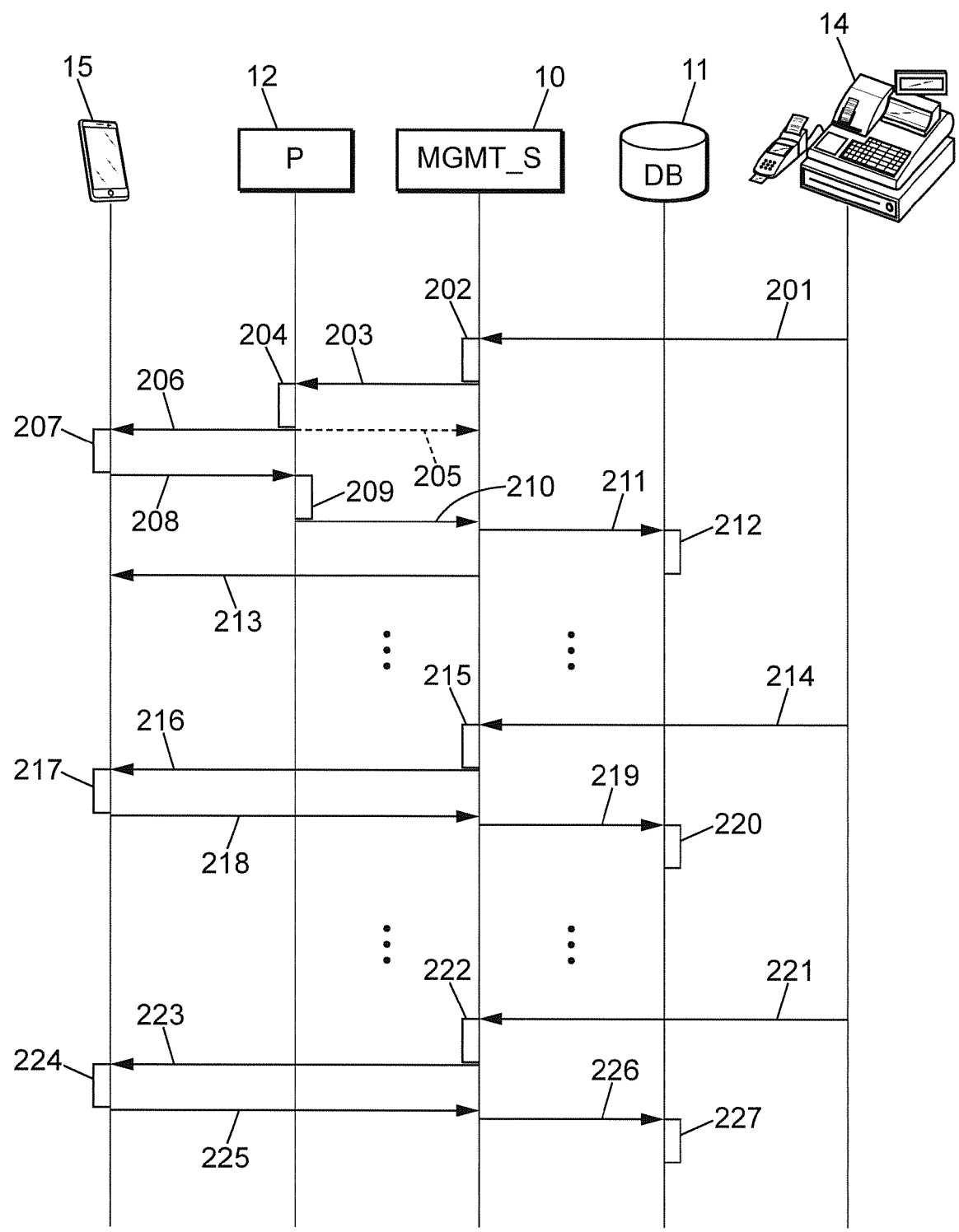
FIG. 2 shows a diagram of exchanges between the entities of the system in FIG. 1, according to an embodiment of the invention.

FIG. 2 shows a diagram of exchanges between the system entities of FIG. 1, and thus shows the steps of a method for securing an entry in the user database 11 according to an embodiment of the invention.

As an example, the following considers that a user has access to the payment terminal 14 in a store, and that it is proposed the creation of a customer account from the seller. For this purpose, instead of providing a paper form to fill in, the seller can propose to the user to input the network identifier of the user terminal 15 belonging to the user. As previously described, the network identifier may be the user's mobile telephone number. In the following, the example of a telephone number is considered, for purely illustrative purposes.

Upon inputting the telephone number, the latter is transmitted to the management server 10 at step 201.

At an optional step 202, the management server 10 can verify that no entry in the database 11 corresponds to the received telephone number. If an entry already exists, the management server 10 can inform the terminal 14 thereof and the method is stopped.

Otherwise, the management server 10 transmits, at step 203, a user confirmation request, the request comprising the received telephone number.

At step 204, upon receiving the user confirmation request, the network platform 12 can verify that a security application is installed on the user terminal 15 identified by the telephone number comprised in the request. Security application refers to any downloadable (or embedded) application that can be installed on the security module of the user terminal, and allowing to control a pop-up window in order to request from the user the approval or refusal of the confirmation to create a customer account.

In order to perform the verification step, the network operator can have a database storing the network identifiers (or telephone numbers) of the user terminals having such a security application.

In case of positive verification that the security application is installed on the security module of the user terminal 15, the network platform 12 can send a message at step 206 to display a pop-up window via the security application installed on the user terminal, the pop-up window proposing to validate or cancel the confirmation. In case of negative verification, a short SMS-type message (for "Short Message Service") can be sent to the user terminal 15, the short message comprising a text asking to return a short confirmation message (for example a short answer message comprising the text body "OK") if the user wishes to create a customer account. Alternatively, in case of negative verification, the network platform 12 can transmit a message to the management server 10 at step 205 indicating that the security application is not installed on the user terminal 15.

At step 207, the user may, via the user terminal 15, accept or refuse the confirmation, either by selecting a corresponding field of the pop-up window (if the security application is installed on the user terminal 15) or by sending a short answer message (if the security application is not installed on the user terminal 15).

Thus, a confirmation or refusal by the user can be transmitted to the network platform 12 at step 208.

The network platform 12 determines at step 209 whether the user has confirmed the creation of a customer account, based on the received answer to the pop-up window or to the short message.

The potential confirmation is then transmitted to the management server at step 210.

Upon receiving a user confirmation from the network platform 12, the management server 10 creates, at step 211, an entry from the terminal 15 user in the user database 11, the entry comprising the network identifier (the telephone number in this example) of the user terminal 15.

The user database 11 stores the entry created at step 212.

Thus, the method according to the invention allows securing the creation of an entry from a user in a user database. Indeed, the confirmation may be advantageously made by the user in front of the seller, which ensures that the network identifier communicated to the seller terminal 14 corresponds to the user. Alternatively, the confirmation may be made remotely, for example when a first person wishes to create a customer account on behalf of a second person.

Furthermore, in cases where the security application is installed on the terminal, the exchanges between the user terminal 15 and the network platform 12 are secured. The use of a pop-up window also facilitates confirmation by the user, compared to the use of short messages. Furthermore, the network operator in charge of the network platform is aware of the user terminals on which the security application is installed, which allows to easily perform verification step 204. Creating the customer account is also facilitated as the user is only required to transmit the telephone number of its user terminal.

In an additional manner, the message may further comprise a step 213, for transmitting from the management server 10, to the user terminal 15, a message comprising a link to a page to fill in additional data related to the user.

"Page" refers to an internet-type page, capable of showing fields associated with each respective additional data related to the user. Thus, filling in this information may be deferred compared to the solution of the former art. Furthermore, data confidentiality is improved with respect to filling in the data on a paper form. An internet page of secured-type "https" for example may be provided to fill in the additional data.

The additional data filled in can then be associated to the entry created at step 211.

The invention also provides complementary steps related to the use of the customer account by the user.

For example, a promotional offer may be proposed to the user by the seller, in which case a credit associated with his/her customer account may be allocated to him/her. In order to ensure that the user corresponds to the telephone number that is communicated to the seller, steps 214 to 220 may be performed.

At step 214, the management server 10 may receive from the seller terminal 14 (or by any other communication mean) credit information associated with the network identifier (the telephone number in this example) of the user terminal 15.

At step 215, the management server 10 extracts the network identifier of the user terminal 15 and produces a credit approval request from the user, so as to transmit it at step 216 to the user terminal 15 identified by the network identifier. No restriction is tied to the credit approval request. It may for example be a short message requiring a short answer message from the user, or it may be a message to display a pop-up window on the user terminal. Such messages may be sent directly by the management server 10 to the user terminal 15, or may transit through the network platform 12.

When a message to display a pop-up window is sent directly from the management server 10 to the user terminal, the management server 10 can store the network identifiers of the users having the security application. Such information may be inferred from not receiving the message described at step 205, informing that the security application is not installed on the user terminal 15.

At step 217, the user may confirm or not that he/she accepts the credit allocated by the seller. The confirmation step may be made by the user in front of the seller who is thus ensured that the communicated network identifier corresponds to the right person.

At step 218, a user credit approval may be received by the management server 10, which thus updates, in the user database 11, at step 219, a user credit based on the credit information received at step 214. Such credit is associated with the entry created at step 211. No restriction is tied to the form taken by the credit (voucher for a product purchase, discount percentage for a next purchase, etc). The updated credit is stored in the user database at step 220.

Furthermore, the user may use the credit previously allocated to him/her, for example during a payment to the seller.

Thus, at step 221, the management server 10 may receive from the seller terminal 14 (or from any other communication mean of the seller) credit consumption information associated with the network identifier (the telephone number in this example) of the user terminal 15.

At step 222, the management server 10 extracts the network identifier of the user terminal 15 and produces an approval request for the credit consumption by the user, so as to transmit it at step 223 to the user terminal 15 identified by the network identifier. No restriction is tied to the approval request for the credit consumption. It may for example be a short message requiring a short answer message from the user. Alternatively, it may be a message to display a pop-up window on the user terminal. Such messages may be sent directly by the management server 10 to the user terminal 15, or may transit through the network platform 12.

As previously explained, when a message to display a pop-up window is sent directly from the management server 10 to the user terminal 15, the management server 10 can store the network identifiers of the users having the security application. Such information can be inferred from not receiving the message described at step 205, informing that the security application is not installed on the user terminal 15.

At step 224, the user may confirm or not that he/she accepts the credit consumption. The confirmation step may be made by the user in front of the seller, who is then ensured that the communicated network identifier corresponds to the customer in front of him/her.

At step 225, an approval for the credit consumption by the user may be received by the management server 10, which thus updates, in the user database 11, at step 226, a user credit based on the credit consumption information received at step 221. The updated credit is stored in the user database at step 227.

Figure 3:
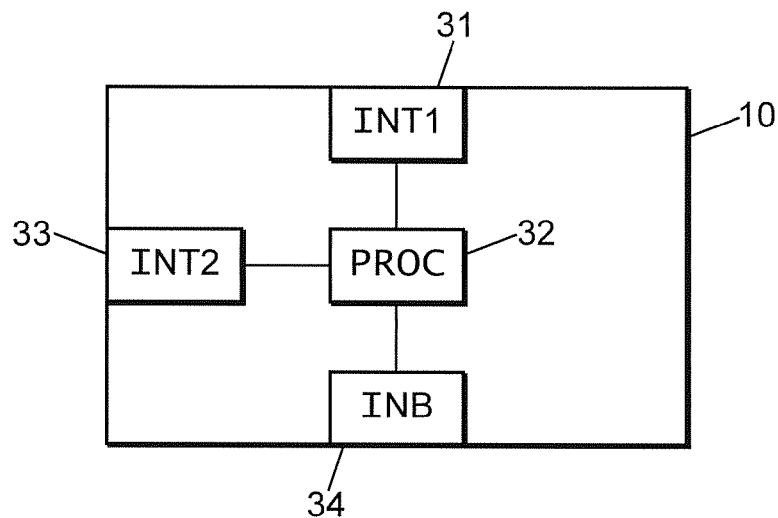
FIG. 3 shows the structure of a management server according to an embodiment of the invention.

FIG. 3 shows a structure of the management server 10 according to an embodiment of the invention.

The management server 10 comprises a first interface 31 for communicating with the user terminal 14, and in particular for receiving the network identifier of the user terminal 15. The management server 10 further comprises a processing unit 32 (a processor for example), able to:
 verify that no entry in the database 11 corresponds to the received telephone number (step 202);
 create an entry by the terminal 15 user in the user database 11 (step 211); extract the network identifier of the user terminal 15 and produce a request for credit approval by the user (step 215);
 update, in the user database 11, a user credit based on the received credit information (step 219);
 extract the network identifier of the user terminal 15 and produce an approval request for the credit consumption by the user (step 222);
 update, in the user database 11, a user credit based on the received credit consumption information (step 226).

The processing unit 32 is also able to associate additional data received by the management server 10, with the entry created at step 211. The processing unit 32 can also store a computer program for performing the steps described above.

A second interface 33 is linked to the telecommunications network 13, and is able to communicate with the network platform 12.

A third interface 34 is able to communicate with the user database 11.

Figure 4:
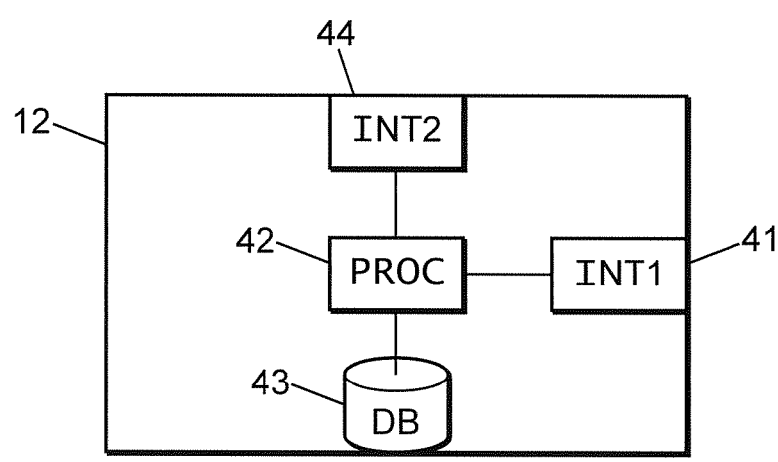
FIG. 4 shows the structure of a network platform according to an embodiment of the invention.

FIG. 4 shows a structure of the network platform 12 according to an embodiment of the invention.

The network platform 12 comprises a first network interface 41 able to communicate in particular with the management server 10, for receiving the request of a user confirmation at step 203, for transmitting the message indicating that no security application is installed on the identified user terminal (step 205) and for transmitting the potential user confirmation (step 210).

Furthermore, the network platform 12 comprises a processing unit 42 and an internal database 43. The internal database 43 can store the network identifiers of the user terminals on which the security application is installed. The processing unit 42 is able to:
 verify that the security application is installed on the user terminal 15 identified by the telephone number comprised in the request received at step 203 (step 204). The processing unit 42 thus fulfills its function as a unit of verification;
 inform the management server 10 that the security application is not installed on the user terminal identified (step 205);
 produce a message to display a pop-up window or a short message to the user terminal 15 (step 206);
 determine at step 209 whether the user has confirmed the creation of a customer account, based on the received answer to the pop-up window or to the short message (step 209).

The processing unit 42 can also store a computer program for performing the previous steps.

The network platform 12 comprises a second network interface 44 able to communicate with the user terminal 15 (for example through a mobile network), and in particular for transmitting, in case of positive verification by the processing unit 42, the message to display a pop-up on the user terminal 15, or short message (step 206), and for receiving an answer from the user terminal (step 208).

The invention claimed is:

1. A system for creating an entry in a user database, the system comprising:
 a first terminal, a network platform including a network platform database storing user terminal network identifiers of user terminals having an installed security application, and a management server, the management server communicating with the first terminal and accessing the network platform in a telecommunications network, the network platform communicating, through the telecommunications network, with a user terminal having an associated user terminal network identifier identifying the user terminal in the telecommunications network, and being different from the first terminal, wherein:
 the first terminal comprises a first processor and a first non-transitory memory storing instructions that, when executed by the first processor, cause the first processor to: receive, from either the user terminal or a user of the user terminal, the user terminal network identifier;
 send the user terminal network identifier to the management server via the telecommunications network;
 the management server comprises a second processor and a second non-transitory memory storing instructions that, when executed by the second processor, cause the second processor to send, via the telecommunications network to the network platform, a user confirmation request that includes the user terminal network identifier;

the network platform comprises a third processor and a third non-transitory memory storing instructions that, when executed by the third processor, cause the third processor to: in response to receiving the user confirmation request, verify that the user terminal includes a security application installed on the user terminal by checking that the user terminal network identifier is present in the network platform database;

send, via the telecommunications network to the user terminal based on the verification, the user terminal network identifier being present in the network platform database, a message to display a pop-up window via the security application installed on the user terminal, the pop-up window requesting a user confirmation response for the user to validate or cancel the user confirmation request; and send, via the telecommunications network, the user confirmation response to the management server, wherein the user confirmation response is received from the user terminal;

the second non-transitory memory of the management server storing instructions that, when executed by the second processor, cause the second processor to: receive the user confirmation response from the network platform; and create, upon validation of the user confirmation request, the entry in the user database comprising the user terminal network identifier.

2. The system according to claim 1, wherein
the third non-transitory memory of the network platform stores instructions that, when executed by the third processor, cause the third processor to determine that the security application is not installed on the user terminal, and send via the telecommunications network, a message to the management server indicating that the security application is not installed on the user terminal.

3. The system according to claim 1, wherein:
the third non-transitory memory of the network platform stores instructions that, when executed by the third processor, cause the third processor to determine that the security application is not installed on the user terminal, and send via the telecommunications network, a short message to the user terminal, the short message requiring a user confirmation; and
the third non-transitory memory of the network platform stores instructions that, when executed by the third processor, cause the third processor to, in case of receiving a short answer message from the user in a form of a confirmation, send, via the telecommunications network, the user confirmation response to the management server.

4. The system according claim 1, wherein:
the third non-transitory memory of the network platform stores instructions that, when executed by the third processor, cause the third processor to, upon receiving the user confirmation response, transmit to the user terminal a message comprising a link to a page to fill in additional data associated with the user; and
the third non-transitory memory of the network platform stores instructions that, when executed by the third processor, cause the third processor to associate said additional data with the entry created in the user database.

5. The system according to claim 1, wherein the third non-transitory memory of the network platform stores instructions that, when executed by the third processor, cause the third processor to:
receive credit information associated with the user terminal network identifier;
transmit to the user terminal a credit approval request from the user comprising the user terminal network identifier; and
update, in the user database upon receiving a credit approval from the user, a user credit based on the received credit information.

6. The system according to claim 1, wherein the third non-transitory memory of the network platform stores instructions that, when executed by the third processor, cause the third processor to:
receive credit consumption information associated with the user terminal network identifier;
transmit to the user terminal an approval request for the credit consumption by the user comprising the user terminal network identifier of the user terminal; and
upon receiving a credit approval by the user, update, in the user database, a user credit based on the received credit consumption information.

7. The system according to claim 1, wherein the second non-transitory memory stores instructions that, when executed by the second processor, cause the second processor to transmit the user confirmation request to the network platform, upon verification that no entries corresponds to the user terminal network identifier in the user database.

8. A telecommunications system comprising a user terminal having an associated user terminal network identifier identifying the user terminal in a telecommunications network, a first terminal different from the user terminal, a network platform including a network platform database storing user terminal network identifiers of user terminals having an installed security application, and a management server communicating with the first terminal and accessing the network platform in the telecommunications network, the network platform communicating, through the telecommunications network, with the user terminal, each of the first terminal, the network platform, and the management server includes a respective processor and a respective memory storing instructions which perform a method for creating an entry in a user database, the method comprising the steps:
receiving, by the first terminal, the user terminal network identifier,
sending, by the first terminal, the user terminal network identifier to the management server via the telecommunications network;
sending, by the management server via the telecommunications network to the network platform, a user confirmation request that includes the user terminal network identifier;
in response to receiving the user confirmation request, verifying, by the network platform, whether the user terminal includes a security application is installed on the user terminal by checking whether the user terminal network identifier is present in the network platform database;
if the user terminal network identifier is present in the network platform database, sending, by the network platform via the telecommunications network to the user terminal a message to display a pop-up window via the security application installed on the user terminal, the pop-up window requesting a user confirmation response for a user of the user terminal to validate or cancel the user confirmation request;

sending, by the network platform via the telecommunications network, the user confirmation response to the management server;

receiving, by the management server the user confirmation response from the network platform, and if the user confirmation response validates the user confirmation request, creating, by the management server, the entry in the user database comprising the user terminal network identifier.

\* \* \* \* \*